(12) United States Patent
Mattio et al.

(10) Patent No.: US 6,382,897 B2
(45) Date of Patent: May 7, 2002

(54) UNIT FOR SORTING AND TRANSFERRING SHEETS OF GLASS

(75) Inventors: Roberto Mattio, Piasco; Sebastiano Bisotto, Boves; Giacomo Aimar, Cervasca, all of (IT)

(73) Assignee: Bottero S.p.A., Cuneo (IT)

( * ) Notice: Subject to any disclaimer, the term of this patent is extended or adjusted under 35 U.S.C. 154(b) by 0 days.

(21) Appl. No.: 09/778,866

(22) Filed: Feb. 8, 2001

(30) Foreign Application Priority Data

Feb. 8, 2000 (IT) ......................................... TO20A0124

(51) Int. Cl.[7] .............................. B65G 49/06; B65G 1/00
(52) U.S. Cl. .............................. 414/331.1; 414/331.06; 414/331.08; 414/400; 414/331.03
(58) Field of Search .................. 414/331.03, 331.1, 414/331.08, 331.06, 400

(56) References Cited

U.S. PATENT DOCUMENTS 5,511,671 A * 4/1996 Zumstein .................... 209/542

5,823,732 A * 10/1998 Lisec .......................... 414/278

FOREIGN PATENT DOCUMENTS

| DE | 0 620 171 | 10/1994 |
|---|---|---|
| DE | 195 25 515 | 1/1997 |
| DE | 198 26 949 | 12/1999 |
| WO | WO 95/25688 | 9/1995 |

* cited by examiner

Primary Examiner—Steven A. Bratlie
(74) Attorney, Agent, or Firm—Oblon, Spivak, McClelland, Maier & Neustadt, P.C.

(57) ABSTRACT

A unit for sorting and transferring sheets of glass has a number of carriages, each having a number of compartments for receiving respective sheets of glass; and a sorting device for supporting the sheets and feeding each of the sheets into a respective compartment; the sorting device having a support for supporting a sheet and rotating about an axis of rotation; and the carriages being arranged in a ring about the rotary support.

14 Claims, 3 Drawing Sheets

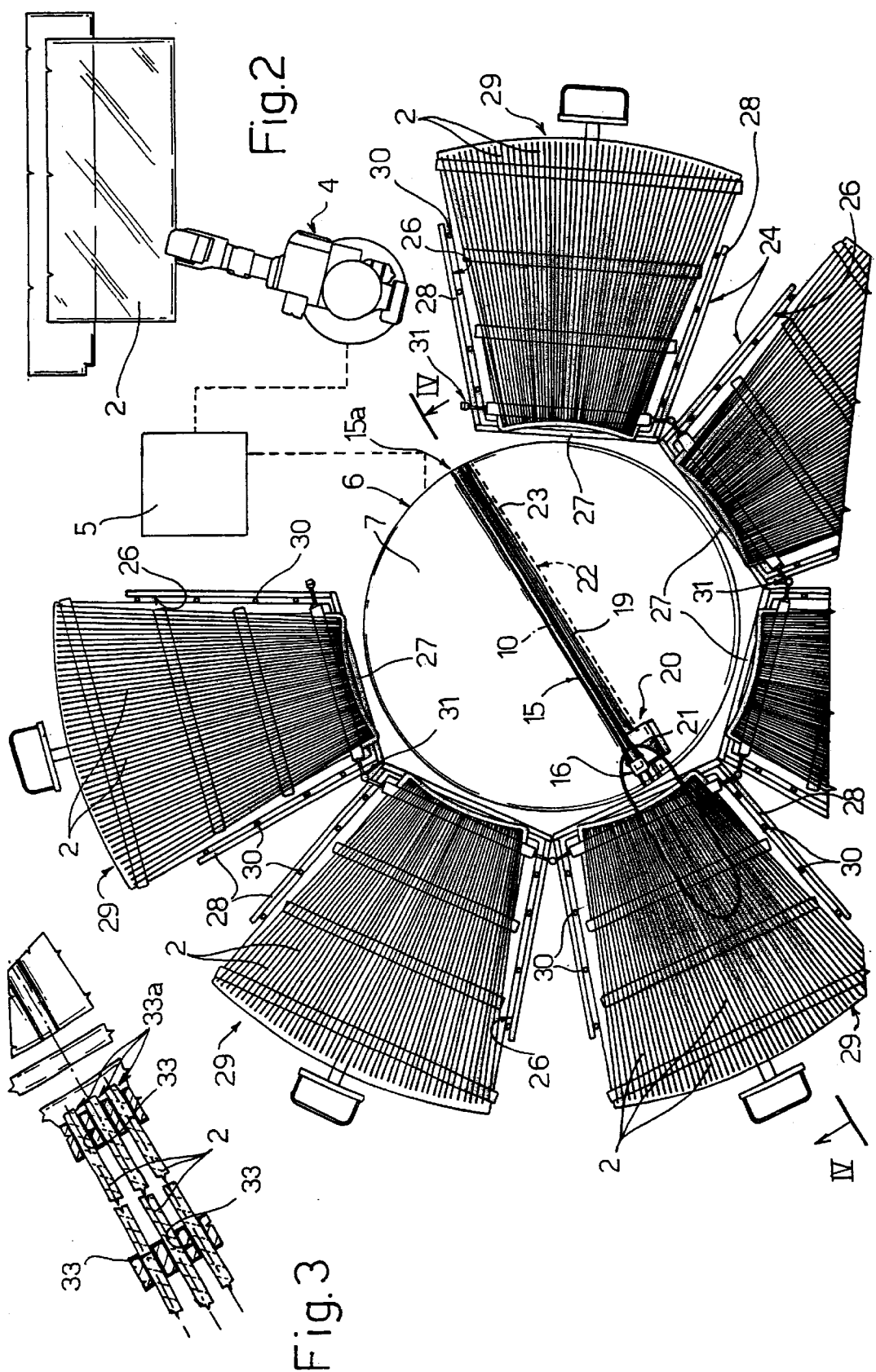

UNIT FOR SORTING AND TRANSFERRING SHEETS OF GLASS

The present invention relates to a unit for sorting and transferring sheets of glass.

BACKGROUND OF THE INVENTION

As is known, processed and/or contoured sheets of glass are produced on systems comprising a break-off station for successively producing a number of sheets of the same or different size and shape, and from where the sheets are normally transferred to respective finishing stations for further processing. To simplify transfer to the finishing stations, the sheets from the break-off station are first sorted and then each transferred to the respective station.

As is known, for example, from Patent EP 0 620 171 B1, the sheets are sorted and transferred using a sorting and transfer unit comprising a number of racks movable to and from respective work stations and each comprising a number of compartments arranged side by side in a straight direction and extending perpendicularly to the straight direction to each receive a respective sheet. The sheets are each conveyed to the respective compartment by a carriage traveling in a direction parallel to said straight direction, and are inserted inside the respective compartments by means of a linear actuator controlled, together with the carriage, by a central control unit.

Though used, known sorting units of the above type have the major drawback of being extremely bulky, especially in the straight rack alignment and carriage travel direction, so that application is limited, especially in existing plants.

Moreover, using known sorting units, the time taken to insert the sheets inside the compartments increases alongside the number of racks, since, the greater the number of compartments, the longer the carriage takes to travel in said straight direction.

SUMMARY OF THE INVENTION

It is an object of the present invention to provide a unit for sorting and transferring sheets of glass, designed to provide a straightforward, low-cost solution to the above problems.

According to the present invention, there is provided a unit for sorting and transferring sheets of glass; the unit comprising a number of carriages, each having a number of compartments, each for receiving at least one respective sheet of glass; and sorting means for supporting the sheets and feeding each of the sheets into a respective compartment; characterized in that said sorting means comprise rotary supporting means rotating about an axis of rotation; and in that said carriages are arranged in a ring about said rotary supporting means.

BRIEF DESCRIPTION OF THE DRAWINGS

A non-limiting embodiment of the invention will be described by way of example with reference to the accompanying drawings, in which:

FIG. 2 shows a larger-scale plan view of a detail in FIG. 1;

FIG. 3 shows a larger-scale view of a detail in FIG. 2;

DETAILED DESCRIPTION OF THE INVENTION

Figure 1:
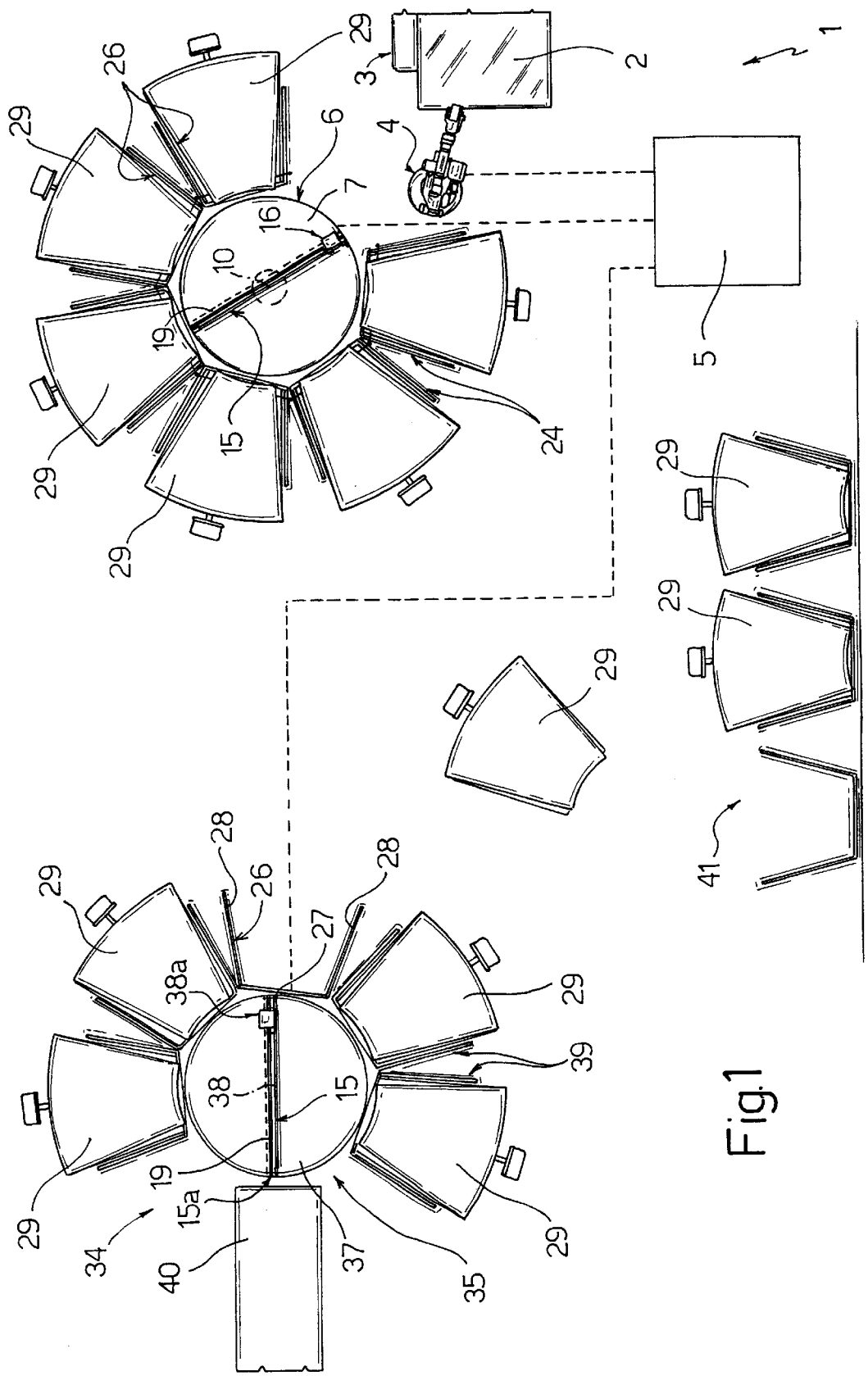
FIG. 1 shows a schematic plan view of a unit for sorting and transferring sheets of glass.

Number 1 in FIG. 1 indicates as a whole a unit for sorting and transferring sheets 2 of glass of the same or different shape and size and originating from a break-off station 3 where previously notched large-size sheets of glass (not shown) are broken up, in the example shown, by a known manipulator 4 not described in detail. In the example shown, manipulator 4 feeds the broken-off sheets 2 successively to unit 1 under the control of a known control unit 5 not described in detail and forming part of unit 1.

Figure 4:
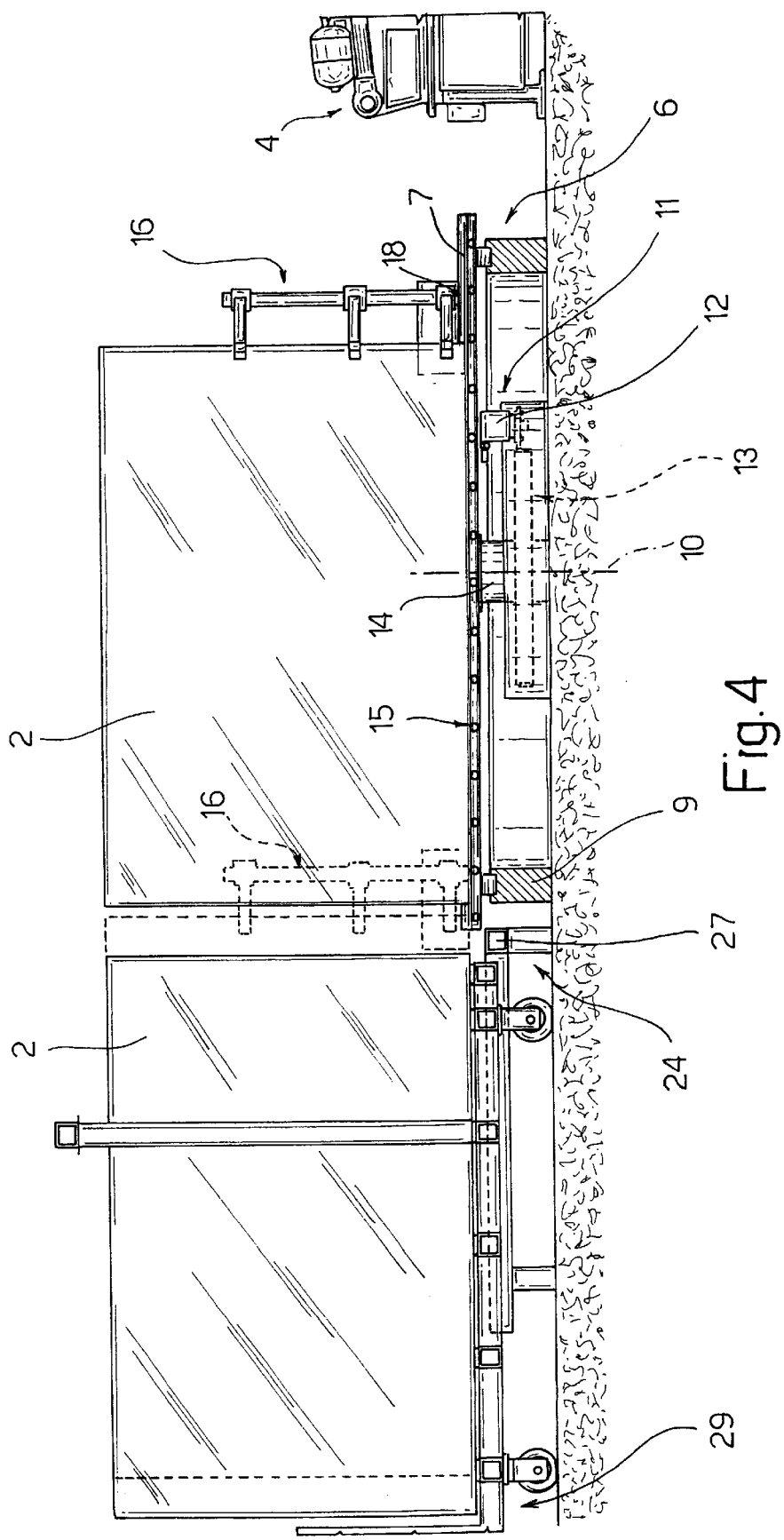
FIG. 4 shows a larger-scale section along line IV—IV in FIG. 2.

Unit 1 also comprises a supporting device 6 in turn comprising a floor-mounted structure 9, and a flat circular platform 7 having a vertical axis of symmetry 10 and connected to structure 9 to rotate about axis 10 in an axially-fixed position. Platform 7 is rotated in opposite directions about axis 10 by an actuating assembly 11 (FIG. 4) comprising an electric motor 12 controlled by unit 5, and a mechanical transmission 13—in the example shown, a gear transmission having a countershaft 14 coaxial with axis 10 and connected integrally to platform 7. On the top surface of platform 7 is formed a support and slide track 15—preferably a roller track (FIGS. 2 and 4), which extends diametrically across platform 7, and on which one sheet 2 at a time is rested on edge by manipulator 4 and rolled along by a powered gripper 16 (FIG. 4). Gripper 16, which is of known type, is carried by and rotated together with platform 7, extends upwards from the top surface of platform 7, and comprises a bottom connecting portion 18 (FIG. 4) connected in sliding manner to a relative straight guide 19 (FIG. 2) connected integrally to platform 7 and extending parallel to and alongside slide track 15.

With reference to FIG. 2, gripper 16 is moved in opposite directions along guide 19 by a device 20 comprising a motor 21 controlled by unit 5, and a mechanical transmission 22, preferably a rack and pinion type, the rack of which is connected integrally to the platform and indicated 23 in FIG. 2.

With reference to FIG. 1 and particularly FIG. 2, platform 7 is surrounded partly by a fixed reference and connecting structure 24, which defines a ring of radial seats 26 of the same shape and size, arranged about platform 7, and each tapering towards platform 7. More specifically, each seat 26 is defined by a bottom wall 27 adjacent to platform 7 and lower than the supporting surface of track 15; and two vertical lateral walls 28 converging towards bottom wall 27 and defining the inlet of respective seat 26 on the opposite side to platform 7. Each seat 26 houses a respective sheet-conveying carriage 29, which is the same size and design as the other carriages 29, is guided in and out of respective seat 26 by a number of vertical rollers 30 connected in rotary manner to the inner surfaces of relative lateral walls 28, and is retained inside respective seat 26 by a known releasable retaining device 31 comprising, for example, one or more pneumatic retaining members fitted, in the example shown, to lateral walls 28.

As shown in FIG. 2 and particularly FIG. 3, each carriage 29 is complementary in shape to that of seats 26, and comprises a number of compartments 33 (FIG. 3), each for receiving a respective sheet 2 and each having a respective inlet/outlet 33a facing platform 7. More specifically, compartments 33 are arranged fan-wise, so that, when carriages 29 are retained inside any of seats 26, compartments 33 extend radially with respect to the axis of rotation 10 of platform 7, and each defines an extension of track 15 when platform 7 is rotated, so that the sheet 2 on track 15 can be simply slid radially into any compartment.

With reference to FIG. 1, unit 1 also comprises one or more unloading stations 34, only one shown in FIG. 1, for unloading carriages 29 and located a distance from structure 24. Each unloading station 34 houses an assembly 35 for unloading and withdrawing sheets 2 and comprising a circular platform 37 of the same size and design as platform 7 and rotating about a respective axis 38 parallel to axis 10; a powered gripper 38a identical with gripper 16; and a fixed structure 39 of the same size and design as structure 24, and the component parts of which are indicated using the same reference numbers as for the corresponding parts of structure 24. Unit 1 also comprises a known conveyor 40 (shown schematically) for withdrawing the sheets 2 unloaded at station 34, and for feeding each sheet 2 to a respective processing station or to a store (not shown).

With reference to FIG. 1, unit 1 also comprises an intermediate or holding station 41 interposed between structures 24 and 39 and for housing a number of carriages 29 waiting to be unloaded or transferred to structure 24.

Operation of unit 1 will now be described with reference, for the sake of simplicity, to one empty carriage 29 retained inside one of seats 26 on structure 24, and as of the condition in which a sheet 2 to be transferred is gripped by manipulator 4, and platform 7 is set to the angular position shown in FIG. 2, in which inlet 15a of track 15 is positioned facing manipulator 4.

As of the above condition, sheet 2 is positioned on edge and rested inside inlet 15a of track 15, and is then gripped by gripper 16 and slid along track 15 to extend across platform 7. At this point, platform 7 is rotated about its axis to align inlet 15a of track 15 with an inlet 33a of one of compartments 33, and gripper 16 is operated again to slide sheet 2 along track 15, in the opposite direction to before, and gradually into compartment 33. The above operations are repeated for each broken-off sheet 2 to insert each sheet 2 inside a given compartment 33, and, when compartments 33 are all engaged, carriage 29 is released from structure 24 by deactivating retaining device 31, and is either transferred to holding station 41 pending further transfer, or is inserted directly and locked inside one of seats 26 on structure 39. At this point, platform 37 is rotated to align inlet 15a of track 15 with inlet 33a of one of compartments 33; and the relative sheet 2 is then gripped by gripper 16 and drawn gradually out of compartment 33 and on to platform 37, which is rotated about axis 38 to align track 15 with conveyor 40, on to which sheet 2 is pushed by gripper 16 in the opposite direction to before.

As compared with known solutions, unit 1 described is obviously extremely compact, and can therefore be installed in any plant, including existing ones. This is mainly due to arranging the carriages in a ring about a two-way rotary conveyor platform fitted with a member for loading the sheets successively on to the platform and unloading the sheets successively into respective compartments on one of the carriages according to a given delivery sequence.

As compared with known solutions, unit 1 is also extremely straightforward to produce and control, by the sheets 2 being picked up, transferred and inserted inside the relative compartments one at a time.

Despite the sheets being picked up, transferred and inserted inside the compartments one at a time, the unit described provides for fast insertion as compared with known solutions, by the angular displacement of platform 7 being at most substantially 180° regardless of the number of carriages used.

Using identical assemblies for unloading and loading carriages 29 makes unit 1 even more compact, and, above all, reduces manufacturing, maintenance and service costs by, for example, halving spare part storage requirements.

Clearly, changes may be made to unit 1 as described herein without, however, departing from the scope of the present invention. In particular, both platforms 7 and 37 could be replaced with different rotary structures for supporting and moving sheets 2 to and from compartments 33 of carriages 29. Unit 1 may be built without both or either of structures 24, 39, and carriages 29 locked in fixed angular positions about axes 10, 38 otherwise than as described by way of example. In particular, carriages 29 may be powered and programmed to travel along predetermined paths to and from relative platforms 7, 37, possibly via one or more intermediate holding stations.

Finally, broken-off sheets 2 may be fed on to platform 7 by devices other than a manipulator, e.g. overhead conveyors, and may be fed along the tracks by gripping means other than those described, and which may provide for simply pushing or also supporting the sheet for transfer.

What is claimed is:

1. A unit (1) for sorting and transferring sheets (2) of glass; the unit (1) comprising a number of carriages (29), each having a number of compartments (33), each for receiving at least one respective sheet (2) of glass; and sorting means (6, 16) for supporting the sheets (2) and feeding each of the sheets (2) into a respective compartment (33); characterized in that said sorting means (6, 16) comprise rotary supporting means (7, 16) rotating about an axis (10) of rotation; and in that said carriages (29) are arranged in a ring about said rotary supporting means (7, 16).

2. A unit as claimed in claim 1, characterized in that said rotary supporting means (7, 16) comprise a single slide track (15) for the sheets (2); and said sorting means (6, 16) also comprise conveying means (16, 20) for moving one sheet (2) at a time along said slide track (15).

3. A unit as claimed in claim 2, characterized by also comprising first actuating means (11) for rotating said rotary supporting means (7, 16) in opposite directions about said axis (10) of rotation, and for aligning said slide track (15) with each said compartment (33).

4. A unit as claimed in claim 2, characterized in that said conveying means (16, 20) comprise gripping means (16); and second actuating means (20) for moving said gripping means (16) in opposite directions parallel to said slide track (15).

5. A unit as claimed in claim 4, characterized in that said second actuating means comprise an electric motor (21), and a mechanical transmission (22) activated by said electric motor (21).

6. A unit as claimed in claim 1, characterized in that said supporting means (7, 16) comprise a circular platform (7) coaxial with said axis (10) of rotation.

7. A unit as claimed in claim 6, characterized in that said compartments (33) extend radially about said circular platform (7).

8. A unit as claimed in claim 1, characterized by also comprising a fixed structure (24) fixed with respect to said axis (10) of rotation; said fixed structure (24) defining a number of seats (26), each housing a relative said carriage (29); and releasable retaining means (31) being provided to retain each said carriage (29) in a fixed position inside the relative seat (26).

9. A unit as claimed in claim 1, characterized by also comprising unloading means (16, 37, 39) for unloading said carriages (29) when withdrawn from said sorting means (6, 16); said unloading means (16, 37, 39) comprising further rotary supporting means (16, 37) rotating about a further axis (38) of rotation.

10. A unit as claimed in claim 9, characterized in that said axes (10)(38) of rotation are separate.

11. A unit as claimed in claim 9, characterized in that said axes (10)(38) of rotation are parallel.

12. A unit as claimed in claim 9, characterized in that said further rotary supporting means (16, 37) comprise a single further slide track (15), and further gripping means (16) for moving one sheet (2) at a time along said further slide track (15).

13. A unit as claimed in claim 11, characterized in that said unloading means (16, 37, 39) comprise a further fixed structure (39) fixed with respect to said further axis (38) of rotation and identical with the fixed structure (24) of said sorting means (6, 16).

14. A unit as claimed in claim 13, characterized in that said unloading means (16, 37, 39) also comprise further actuating means (11) for rotating said further rotary supporting means (16, 37) in opposite directions about said further axis (38), and for aligning said further slide track (15) with each compartment (33) on the carriages (29) retained by said further fixed structure (39).

\* \* \* \* \*

UNITED STATES PATENT AND TRADEMARK OFFICE
CERTIFICATE OF CORRECTION

PATENT NO. : 6,382,897 B2
DATED : May 7, 2002
INVENTOR(S) : Mattio et al.

It is certified that error appears in the above-identified patent and that said Letters Patent is hereby corrected as shown below:

<u>Title page,</u>
Item [30], the Foreign Application is incorrect. Item [30] should read as follows:

-- [30]  Foreign Application Priority Data
    Feb. 8, 2000 (IT) ................................ TO2000A 000124 --

Signed and Sealed this

Twenty-second Day of October, 2002

Attest:

JAMES E. ROGAN
Attesting Officer       Director of the United States Patent and Trademark Office